Patented Mar. 6, 1934

1,950,000

UNITED STATES PATENT OFFICE 1,950,000

PROCESS FOR THE TREATMENT OF ORES CONTAINING LEAD

Paul Gamichon, Paris, France

No Drawing. Application June 12, 1931, Serial No. 543,820. In France June 18, 1930

6 Claims. (Cl. 75—18)

It is well-known that dry processes of treating ores containing lead give unsatisfactory results. On the other hand, the known wet processes generally entail heavy expenditure of acids or of other expensive chemical products.

This invention relates to a process for the treatment of ores containing lead by wet means which ensure a very high output and which limit the consumption of raw materials to such quantities as may be lost by leakages in the apparatuses.

The process consists essentially in a wet conversion of galena or other ores by chlorine.

It has long been known that chlorine is the best converter of galena, of blende and of sulphide of silver. Its use by dry means has even been proposed but such use has shown indifferent results and is attended by many difficulties.

According to this invention, on the other hand, the metallic sulphides are attacked in a perfectly continuous manner by wet means owing to the presence of catalysts.

Hydrochloric or sulphuric acid and ferric chloride are used simultaneously, as catalysts.

The use of ferric chloride has already been suggested, to convert the sulphides into chlorides, but this has involved the use of ferric chloride and acid concentrations which made application impossible and cost prohibitive.

By means of the process to which this invention refers, on the other hand, the mixture of ferric chloride and of acid is used only for catalytic purposes. The ore is treated hot in a very highly acid brine containing a small quantity of ferric chloride, over which a regular flow of chlorine is caused to pass unceasingly.

The total lead reaction is as follows:

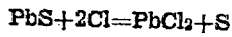

$$PbS + 2Cl = PbCl_2 + S$$

The catalytic part played by the ferric chloride may be explained as under:

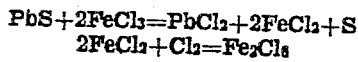

$$PbS + 2FeCl_3 = PbCl_2 + 2FeCl_2 + S$$
$$2FeCl_2 + Cl_2 = Fe_2Cl_6$$

The reactions should be of the same order in regard to the other metals which the ore might contain.

In order to exemplify, without limiting the scope of the invention, a form of application of the process, 100 kilos of Cevennes (France) lead ore is crushed, containing 40 kg. lead in the form of sulphide, to pass through a sieve of 80 mesh approximately.

Said crushed ore is thereupon placed in 1000 litres of brine containing at least 250 grammes NaCl or CaCl$_2$ per litre. The mixture is heated to 80° C. and is mechanically stirred during the whole duration of the treatment.

Five litres at least of hydrochloric acid (22° Bé) and 25 kg. at least of ferric chloride in solid form are then poured into the solution. A stream of chlorine is then caused to bubble in the midst of the solution.

Upon leaving the treatment vat, the vapor containing chlorine gas more especially which has not reacted, is led to a second vat identical to that in which the aforesaid treatment took place and which contains the same substances and the same reagents. At the end of the treatment, said second vat receives the fresh chlorine intended for use in a fresh treatment and the latter takes place in said second vat, escape being towards the first vat, and so on.

When all the lead sulfide has been converted, (which takes place immediately and with a completeness approximating theory) the entire mixture is filtered while hot.

The greater part of the chloride of lead crystallizes by the cooling of the filtration liquors. As to the mother-lyes which still contain a slight amount of chloride of lead, these may be treated afresh, with a new batch of ore.

It is to be noted that other metals which may be contained in the ore will likewise be wholly converted into chlorides.

Should the ore contain silver, the latter may be easily eliminated from the liquors by precipitation or by any other means.

What is claimed is:

1. A process for the treatment of sulfide ores containing lead, which consists in wetting said ores with an alkali metal chloride, heating the same, and attacking the wet, heated ore with a stream of chlorine gas in the presence of a mixture of an acid and ferric chloride acting as a catalyst.

2. A process for the treatment of sulfide ores containing lead, which consists in wetting said ores with an alkali metal chloride, heating the same, attacking the wet, heated ore with a stream of chlorine gas in the presence of a mixture of an acid and ferric chloride acting as a catalyst, filtering the resultant mixture while still heated, and thereafter crystallizing the contained chloride of lead from the liquid by cooling the same.

3. A process for the treatment of sulfide ores containing lead, and which consists in wetting said ores with an alkali metal chloride, heating the same, attacking the wet, heated ore with a stream of chlorine gas in the presence of a mixture of an acid and ferric chloride acting as a catalyst, filtering the resultant mixture while still heated, and thereafter crystallizing the contained chloride of lead from the liquid by cooling the same, and in separating the silver chloride from the brine by precipitation.

4. A process for the treatment of sulfide ores containing lead, which consists in wetting said ores with sodium chloride, heating the same, and attacking the wet, heated ore with a stream of chlorine gas in the presence of a mixture of an acid and ferric chloride acting as a catalyst.

5. A process for the treatment of sulfide ores containing lead, which consists in wetting said ores with sodium chloride, heating the same, attacking the wet, heated ore with a stream of chlorine gas in the presence of a mixture of an acid and ferric chloride acting as a catalyst, filtering the resultant mixture while still heated, and thereafter crystallizing the contained chloride of lead from the liquid by cooling the same.

6. A process for the treatment of sulfide ores containing lead, which consists in wetting said ores with sodium chloride, heating the same, attacking the wet, heated ore with a stream of chlorine gas in the presence of a mixture of an acid and ferric chloride acting as a catalyst, filtering the resultant mixture while still heated, thereafter crystallizing the contained chloride of lead from the liquid by cooling the same, and in separating the silver chloride from the brine by precipitation.

PAUL GAMICHON.